J. BROCKWAY.
APPARATUS FOR COMPRESSING, STRAINING, AND MOLDING PLASTIC PYROXYLINE.
No. 113,735. Patented Apr. 18, 1871.
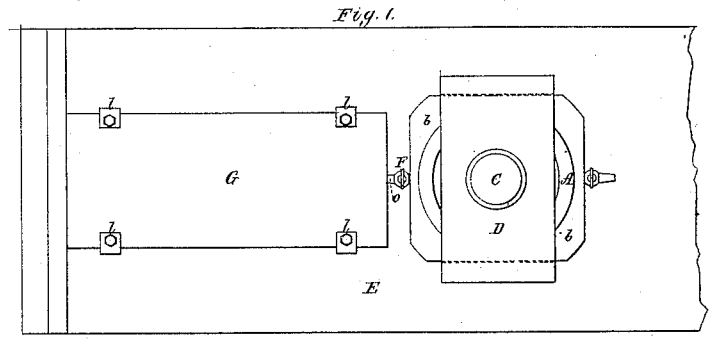
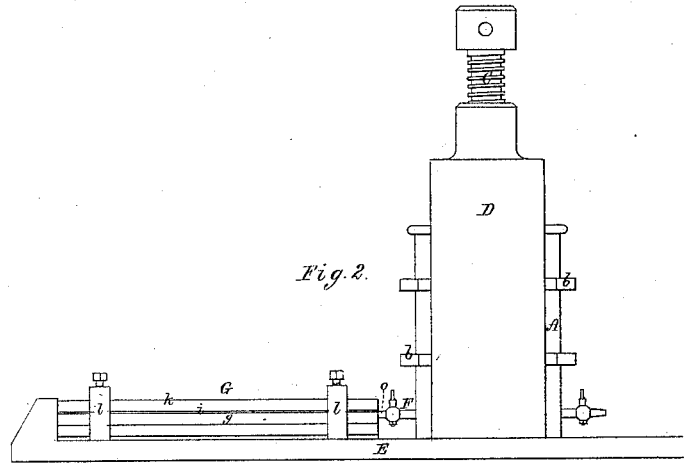
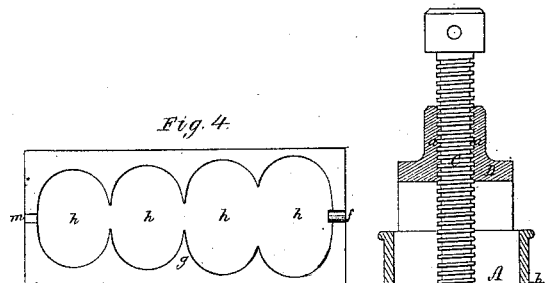
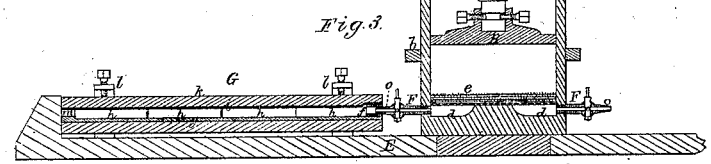
Witnesses
S. N. Piper
J. M. Snow
Josephus Brockway
by his attorney
R. H. Eddy

UNITED STATES PATENT OFFICE.

JOSEPHUS BROCKWAY, OF ALBANY, NEW YORK, ASSIGNOR TO HIMSELF AND URIAL K. MAYO, OF BOSTON, MASSACHUSETTS.

IMPROVEMENT IN APPARATUS FOR COMPRESSING, STRAINING, AND MOLDING PLASTIC PYROXYLINE.

Specification forming part of Letters Patent No. 113,735, dated April 18, 1871.

*To all whom it may concern:*

Be it known that I, JOSEPHUS BROCKWAY, of the city and county of Albany, and State of New York, have invented a new and useful Apparatus for Compressing, Straining, and Molding Plastic Pyroxyline; and I do hereby declare the same to be fully described in the following specification and represented in the accompanying drawings, of which—

Figure 1 is a top view, Fig. 2 a side elevation, and Fig. 3 a longitudinal section, of such apparatus. Fig. 4 is a top view of the lower of its mold-plates.

The special purpose for which such invention is calculated for use in the arts is the condensing of a solution of pyroxyline, and the straining and molding of it.

The solution in question may be supposed to be composed of what is termed and known as "gun-cotton" dissolved in a mixture of ether and alcohol. To sufficiently strain and mold it and condense it so as to expel bubbles from it requires that it be subjected to the action of a powerful press, in connection with one or more sieves or strainers and a mold or series of molds, the conduit leading from the press into the molds being provided with a cock for closing or opening it to the necessary extent.

In the drawings, A denotes a hollow cylinder, provided with a piston, B, a screw, C, being applied or pivoted to such piston. The said screw engages with a female screw, $a$, in the crown of an arched standard, D, erected on a bed-plate, E, on which the cylinder rests.

The said cylinder is closed at bottom and open at top, and has a series of square metallic plates, $b\ b$, applied to it, they being arranged with respect to it in manner as represented, in which arrangement each plate fits closely to and encompasses the cylinder, and has a width equal to, or a little less than, the distance between the two vertical positions of the press-frame.

The said plates are not only to answer the purpose of hoops to the cylinder, but to prevent it from being turned around within the press-frame while the platen may be in the act of being driven down within the cylinder by the screw C.

In the bottom of the cylinder there are one or two grooves or channels, $d$, whose purpose is to receive the strained material and lead it to the gage cock or cocks. Resting on the said bottom is one or more sieves or disks, $e$, of woven wire or foraminous plates. A gage-cock, F, provided with a conical or tapering nose, $o$, opens out of the cylinder, or that part, $d$, of it which is immediately below the strainer or strainers $e$. The said conical or tapering nose is intended to enter and fit closely to the induct $f$ of a mold, G. The said mold is composed not only of a base-plate, $g$, having one matrix or a series of matrices, $h$, formed in it, but of one or more cap-plates, $i\ k$, to lie on and cover the plate $g$, clamps $l\ l$ being employed to hold the two plates in close connection during the process of filling the matrices. Furthermore, there is an educt-passage, $m$, leading out of the terminal matrix of the mold, such being for the escape of air, and to indicate when the molds are properly filled with the material. If desirable, a stop-cock may be applied to such air-escape passage.

The several matrices open into each other, in order that the pasty pyroxyline may pass from one matrix into the next in advance throughout the series.

I usually have two gage-cocks to the cylinder, in order that two molds may be applied and simultaneously used with it, such cocks being arranged as represented.

The solution of pyroxyline, while being strained and molded, has to be subjected to powerful pressure in order to condense it and expel air from it, or deprive it of bubbles.

By means of the gage-cock the flowage of the pressed pyroxyline into the mold may be regulated, in order that the material while in the cylinder may have imparted to it the requisite amount of pressure to condense it, so as to rid it of bubbles and drive it through the strainers.

The lower mold-plate $g$ has fixed to it an induction-tube, $f$, to the outside of which the cap-plate of the mold fits when in place in the mold; or such cap-plate is recessed to receive the induct-tube. It is preferable, on several accounts, to have the induct of the mold or tube so applied to the base-plate. The circular flat and channeled bottom of the cylinder serves to support the series of strainers, and to enable them to be revolved, as circumstances may require, to bring fresh portions directly over the channel or channels, as such sieves may become clogged by the extraneous matters of the solution.

I make no claim to any thing, combination, or arrangement of parts as described or shown in the United States Patent No. 39,481.

Important elements in my apparatus are the straining devices $e$ and the gage-cock F, without which the articles cannot be properly passed, strained, and delivered into the mold.

I claim—

1. The combination of the mold G, the gage-cock F, the cylinder A, the piston B, the screw C, its frame D, and the strainer or strainers $e$, all arranged substantially in manner and for the purpose and to operate as set forth.

2. The arrangement and combination of two or other suitable number of plates, $b$, as described, with the press-cylinder, or such and the mold-frame and screw and piston thereof, as set forth.

3. The mold, as made with the induction-tube $f$ fixed to its matrix-plate, as set forth.

4. The press-cylinder, as constructed with one or more channels, $d$, arranged in its bottom, and relatively to the gage cock or cocks F, as set forth, in combination with the strainer or disk sieves $e$, applied to the said bottom, as specified.

5. The combination of the mold G, the mouth-tube $f$, the tapering-nose gage-cock F, and the straining and condensing press, as set forth, all made, arranged, and applied in manner, and for the purpose of condensing, straining, and molding pyroxyline, substantially as explained.

JOSEPHUS BROCKWAY.

Witnesses:
R. H. EDDY,
J. R. SNOW.